(12) United States Patent
Yoshida et al.

(10) Patent No.: US 6,231,954 B1
(45) Date of Patent: May 15, 2001

(54) LOW-HARDNESS SILICONE RUBBER FIXING ROLLS

(75) Inventors: Takeo Yoshida; Shigeki Shudo; Nobumasa Tomizawa, all of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/166,784

(22) Filed: Oct. 6, 1998

(30) Foreign Application Priority Data

Oct. 7, 1997 (JP) .................................................. 9-290450

(51) Int. Cl.$^7$ ...................................................... B32B 7/02
(52) U.S. Cl. ..................... 428/215; 428/36.9; 428/36.91; 428/213; 428/421; 428/448; 428/450
(58) Field of Search ..................................... 428/448, 450, 428/421, 36.91, 36.9, 213, 215; 492/56

(56) References Cited

U.S. PATENT DOCUMENTS 5,770,298   6/1998   Nakamura et al. .................. 428/195
6,111,221 * 8/2000   Miyakoshi et al. .................. 219/216

FOREIGN PATENT DOCUMENTS 5-323815   12/1993   (JP) .
9-138606    5/1997   (JP) .

OTHER PUBLICATIONS

English Abstract for JP 9–138606, May 1997.
English Abstract for JP 5–323815, Dec. 1993.

* cited by examiner

*Primary Examiner*—D. S. Nakarani
(74) *Attorney, Agent, or Firm*—Millen White Zelano & Branigan

(57) ABSTRACT

A silicone rubber layer is formed on a metal mandrel by curing an addition reaction curing type liquid silicone rubber composition so as to provide a resilience of 5–30% according to JIS K-6301, and an organic resin layer having a low surface energy is provided thereon, thereby yielding a low-hardness silicone rubber fixing roll, which ensures an appropriate nip width even under a low nip pressure and even when the silicone rubber layer is made thin.

14 Claims, No Drawings

LOW-HARDNESS SILICONE RUBBER FIXING ROLLS

BACKGROUND OF THE INVENTION

1. Field of the Invention

This invention relates to heat fixing rolls for use in plain paper copiers (PPC), laser beam printers (LBP), and facsimile machines and more particularly, to low-hardness silicone rubber fixing rolls having a silicone rubber layer on a mandrel and an organic resin layer having a low surface energy thereon.

2. Background Art

Fixing rolls having a silicone rubber layer on the outer surface of a metal mandrel and a fluoroplastic resin layer or fluoroplastic latex layer thereon are often used in various business machines such as copiers, laser beam printers, and facsimile machines because the resin layer has superior toner release properties. With the recent speedup of copiers, laser beam printers, and facsimile machines, the fixing device is required to insure a sufficient fixing width or nip width to increase the time taken for fixation. To this end, attempts have been made to reduce the hardness of rubber material to a level unmeasurable with a JIS hardness meter. However, although the rubber material on the fixing roll is made thin, an appropriate nip width is not obtained even under a low nip pressure because of the high resilience of rubber.

Low-hardness rolls at a hardness level unmeasurable with a JIS hardness meter have the problem that the durable adhesion of fluoro-resin covering the outer surface of silicone rubber is adversely affected if silicone rubber experiences substantial hardness variations under different curing conditions (primary vulcanization conditions).

SUMMARY OF THE INVENTION

Therefore, an object of the present invention is to provide a low-hardness fixing roll in which an appropriate nip width is obtained even under a low nip pressure and even when the silicone rubber layer is made thin and which is improved in durable adhesion between the silicone rubber layer and the outer fluoro-resin layer. The term "fixing roll" used herein encompasses both a fixing roll and a pressure roll also known as backup roll.

The present invention is directed at a low-hardness silicone rubber fixing roll comprising a cylindrical solid or hollow metal mandrel, a silicone rubber layer surrounding the outer surface of the mandrel, and an organic resin layer having a low surface energy formed on the outer surface of the silicone rubber layer. The silicone rubber layer is formed by curing to the mandrel an addition reaction curing type liquid silicone rubber composition which cures into silicone rubber having a resilience of up to 30% according to JIS K-6301. The liquid silicone rubber composition is preferably such that when it is cured under primary vulcanization conditions including a temperature of 100 to 200° C. and a time of 10 to 30 minutes, the cured silicone rubber has a maximum hardness and a minimum hardness, the difference between the maximum hardness and the minimum hardness being up to 10 Ascar CSR2 units. Then the fixing roll provides an appropriate nip width even under a low nip pressure and even when the silicone rubber layer is made thin.

Typically, the liquid silicone rubber composition comprises as essential components, (A) 100 parts by weight of an organopolysiloxane containing per molecule at least two aliphatic unsaturated hydrocarbon groups each attached to a silicon atom only in side chains of the molecule, the content of siloxane units containing the aliphatic unsaturated hydrocarbon groups being 0.05 to 5 mol %, (B) an organohydrogenpolysiloxane having at least three hydrogen atoms each directly attached to a silicon atom per molecule and represented by the following general formula (1):

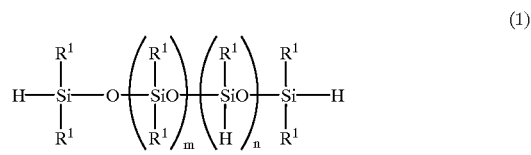

(1)

wherein $R^1$ is a substituted or unsubstituted monovalent hydrocarbon group, letters m and n are integers of at least 1, in such an amount that 0.1 to 3.0 mol of the hydrogen atoms directly attached to silicon atoms (i.e., SiH groups) in component (B) are available relative to 1.0 mol of the aliphatic unsaturated hydrocarbon groups attached to silicon atoms in component (A), (C) a catalytic amount of a platinum catalyst, and (D) about 5 to 300 parts by weight of a filler.

DETAILED DESCRIPTION OF THE INVENTION

The low-hardness silicone rubber fixing roll of the invention includes a cylindrical metal mandrel. A silicone rubber layer is formed on the outer surface of the mandrel by curing an addition reaction curing type liquid silicone rubber composition thereto, the cured silicone rubber having a resilience of up to 30% according to JIS K-6301. An organic resin layer having a low surface energy is formed on the outer surface of the silicone rubber layer.

The metal mandrel of the fixing roll may be formed of any desired metal material such as iron, aluminum or stainless steel. It may be surface treated with a primer. The mandrel is cylindrical and either solid or hollow.

The silicone rubber layer on the outer surface of the metal mandrel is formed by curing to the mandrel an addition reaction curing type liquid silicone rubber composition which cures into a silicone rubber having a resilience or rubbery rebound of up to 30%, preferably 5 to 25%, more preferably 10 to 20%, according to JIS K-6301. When a liquid silicone rubber composition yielding a resilience of more than 30% is used, an appropriate nip width is not obtained even under a low nip pressure, which is undesirable for roll performance in high-speed fixing devices. A resilience of less than 5% implies that the roll (silicone rubber) once deformed under a nip pressure restores its original shape at a slow rate, which can result in unevenly fixed images in the case of high-speed fixing devices.

In order to manage the hardness of low-hardness rolls at a level unmeasurable with a JIS hardness meter, it is recommended to measure the hardness by an Ascar CSR2 hardness meter which is disclosed in Journal of Japanese Rubber Society, 6, 7 (1996), 516 and manufactured by Kobunshi Keiki K.K. The liquid silicone rubber composition is preferably such that a hardness change under curing conditions (primary vulcanization conditions) is not greater than ±5 Ascar CSR2 units. That is, when it is cured under primary vulcanization conditions including a temperature of 100 to 200° C. and a time of 10 to 30 minutes, the difference between a maximum hardness and a minimum hardness of the cured silicone rubber is not greater than 10 Ascar CSR2 units. If the hardness difference is greater than 10 units, the silicone rubber does not have the desired hardness and does not durably bond with an organic resin layer having a low surface energy such as fluorocarbon resin or fluorocarbon latex.

The liquid silicone rubber composition from which the silicone rubber layer is formed is preferably a composition comprising (A) 100 parts by weight of an organopolysiloxane, having at least two aliphatic unsaturated hydrocarbon groups attached to silicon atoms in a molecule, (B) an organohydrogenpolysiloxane having at least two hydrogen atoms each directly attached to a silicon atom per molecule in an amount to give 0.1 to 3.0 mol of the hydrogen atoms directly attached to silicon atoms (i.e., SiH groups) in component (B), relative to 1.0 mol of the aliphatic unsaturated hydrocarbon groups attached to silicon atoms in component (A), (C) a catalytic amount of a platinum catalyst, and (D) about 5 to 300 parts by weight of a filler.

Component (A) or aliphatic unsaturated hydrocarbon group-bearing organopolysiloxane is a well-known organopolysiloxane commonly used as the base of conventional addition reaction curing type liquid silicone rubber compositions. The organopolysiloxane used herein preferably has a viscosity of 100 to 100,000 centipoise (cp) at room temperature (25° C.) and is represented by the following average compositional formula (2):

$$R_aSiO_{(4-a)/2} \qquad (2)$$

wherein R is a substituted or unsubstituted monovalent hydrocarbon group and letter is a positive number of 1.9 to 2.4.

In formula (2), R is preferably selected from substituted or unsubstituted monovalent hydrocarbon groups having 1 to 12 carbon atoms, more preferably 1 to 8 carbon atoms. At least two of the entire R groups should be aliphatic unsaturated hydrocarbon groups such as alkenyl groups. Illustrative examples of the substituted or unsubstituted monovalent hydrocarbon groups will be given later.

Illustrative examples of the organopolysiloxane having aliphatic unsaturated hydrocarbon groups are given below. These organopolysiloxanes are not limited to linear ones and may be branched ones containing $RSiO_{3/2}$ or $SiO_{4/2}$ units.

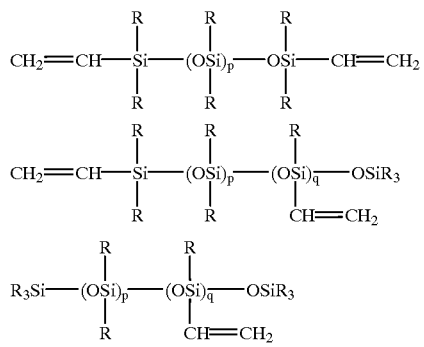

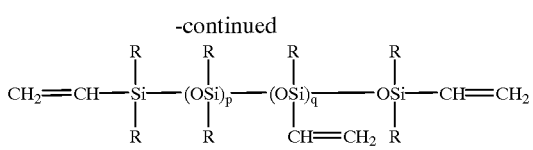

In these formulae, R is as defined above, and preferably substituted or unsubstituted monovalent hydrocarbon groups free of an aliphatic unsaturated bond, letters p and q are positive integers.

As the organopolysiloxane (A), it is especially preferred from the rubber hardness lowering standpoint to use an organopolysiloxane containing per molecule at least two aliphatic unsaturated hydrocarbon groups each attached to a silicon atom only in side chains of the molecule, that is, as substituents attached to silicon atoms in diorganosiloxane units, in which the content of siloxane units containing the aliphatic unsaturated hydrocarbon groups is 0.05 to 5 mol %.

In this sense, the organopolysiloxanes used herein are preferably those represented by the following average molecular formula (3).

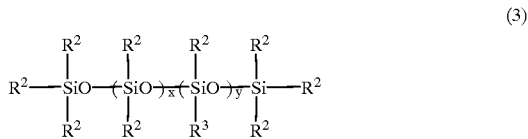

Herein, $R^2$ represents substituted or unsubstituted monovalent hydrocarbon groups excluding aliphatic unsaturated hydrocarbon groups, $R^3$ represents monovalent aliphatic unsaturated hydrocarbon groups, letters x and y are integers satisfying $x \geq 38$, $y \geq 2$, $40 \leq x+y \leq 20,000$, preferably $100 \leq x+y \leq 10,000$, and $0.05 \leq 100y/(x+y) \leq 5$, preferably $0.1 \leq 100y/(x+y) \leq 3$.

In formula (3), the hydrocarbon groups represented by $R^2$ are preferably those of 1 to 12 carbon atoms, more preferably 1 to 8 carbon atoms, for example, alkyl groups such as methyl, ethyl, propyl, isopropyl, butyl, isobutyl, tert-butyl, hexyl, cyclohexyl, octyl, and decyl; aryl groups such as phenyl and tolyl; aralkyl groups such as benzyl and phenylethyl; and substituted ones of these groups in which some or all of the hydrogen atoms are replaced by halogen atoms such as chlorine, bromine and fluorine or cyano groups, such as chloromethyl, bromoethyl, 3,3,3-trifluoropropyl and cyanoethyl. Of these, methyl, phenyl and 3,3,3-trifluoropropyl are preferred. The aliphatic unsaturated hydrocarbon groups represented by $R^3$ are, for example, alkenyl groups of 2 to 6 carbon atoms, especially 2 to 4 carbon atoms, such as vinyl, allyl, propenyl, isopropenyl, butenyl, isobutenyl and hexenyl, with the vinyl being most preferred.

In formula (3), the respective substituents represented by $R^2$ and $R^3$ may be the same or different. The organopolysiloxane should contain per molecule at least two aliphatic unsaturated hydrocarbon groups only in side chains of the molecule, that is, solely as substituents $R^3$ attached to silicon atoms in the diorganosiloxane units represented by $R^2R^3SiO_{2/2}$, in which the content of siloxane units containing the aliphatic unsaturated hydrocarbon groups is 0.05 to 5 mol %, preferably 0.1 to 3 mol %. It is noted that the content (mol %) of siloxane units containing the aliphatic unsaturated hydrocarbon groups is the proportion of the siloxane units containing the aliphatic unsaturated hydrocarbon groups (that is, $R^2R^3SiO_{2/2}$ units) relative to the diorganosiloxane units constituting the backbone of the organopolysiloxane (that is, the sum of $R^2_2SiO_{2/2}$ and $R^2R^3SiO_{2/2}$ units). If the content of siloxane units containing the aliphatic unsaturated hydrocarbon groups is less than 0.05 mol %, it becomes difficult to maintain the physical properties such as mechanical strength of rubber. If the same content is more than 5 mol %, it becomes very difficult to produce low-hardness cured rubber.

This organopolysiloxane is generally a linear diorganopolysiloxane having a backbone consisting essentially of recurring diorganosiloxane units (that is, $R^2_2SiO_{2/2}$ and $R^2R^3SiO_{2/2}$ units) and blocked with a triorganosiloxy group (that is, $R^2_3SiO_{1/2}$ unit) at either end of its molecular chain although it may also be a branched or cyclic one partially containing $R^2SiO_{3/2}$, $R^3SiO_{3/2}$ or $SiO_{4/2}$ units.

The organopolysiloxane of formula (3) usually has a degree of polymerization (corresponding to the number of silicon atoms per molecule) of about 50 to 20,000, preferably about 100 to 15,000, more preferably about 500 to 10,000.

Component (B) is an organohydrogenpolysiloxane which serves as a crosslinking agent by reacting with component (A). The organohydrogenpolysiloxane is not particularly limited in molecular structure and any of conventional organohydrogenpolysiloxanes including linear, cyclic, branched and three-dimensional network ones may be used although the organohydrogenpolysiloxane should have at least two, preferably at least three hydrogen atoms each directly attached to a silicon atom (that is, SiH groups) per molecule. The substituents each attached to a silicon The organohydrogenpolysiloxane of component (B) preferably has the following average compositional formula (4):

$$R^1_b H_c SiO_{(4-b-c)/2} \quad (4)$$

wherein $R^1$ is a substituted or unsubstituted monovalent hydrocarbon group having 1 to 12, preferably 1 to 8 carbon atoms and preferably excluding an aliphatic unsaturated momovalent hydrocarbon group, letter b is a positive number of 0.7 to 2.1, preferably 1 to 2, letter c is a positive number of 0.002 to 1, preferably 0.01 to 0.6, and b+c is in the range of 0.8 to 3, preferably 1.5 to 2.6.

The substituent $R^1$ attached to a silicon atom in the organohydrogenpolysiloxane is a substituted or unsubstituted monovalent hydrocarbon group having 1 to 12, preferably 1 to 8 carbon atoms. The examples of the monovalent hydrocarbon group $R^1$ are the same as those of the substituent $R^2$ of the average molecular formula (3) in the organopolysiloxane of component (A). Preferably, $R^1$ does not contain aliphatic unsaturated hydrocarbon groups.

Examples of the organohydrogenpolysiloxane include methylhydrogencyclopolysiloxane, both end trimethylsiloxy group-terminated methylhydrogenpolysiloxanes, both end trimethylsiloxy group-terminated dimethylsiloxane-methylhydrogensiloxane copolymers, both end dimethylhydro-gensiloxy group-terminated dimethylpolysiloxanes, both end dimethylhydrogensiloxy group-terminated methylhydrogen-polysiloxanes, both end dimethylhydrogensiloxy group-terminated dimethylsiloxane-methylhydrogensiloxane copolymers, both end trimethylsiloxy group-terminated methylhydrogensiloxane-diphenylsiloxane-dimethylsiloxane copolymers, copolymers composed of $(CH_3)_2HSiO_{1/2}$ unit and $SiO_{4/2}$ unit, copolymers composed of $(CH_3)_2HSiO_{1/2}$ unit, $SiO_{4/2}$ unit, and $(C_6H_5)SiO_{3/2}$ unit.

Component (B) is added in such an amount that 0.1 to 3.0 mols, especially 0.3 to 2.0 mols of the hydrogen atoms directly attached to silicon atoms (i.e., SiH groups) in component (B) are provided per 1.0 mol of the aliphatic unsaturated hydrocarbon groups attached to silicon atoms in component (A). Blending amounts outside this range would result in short curing or poor compression set.

The organohydrogenpolysiloxane can be prepared by any of well-known methods. In one commonly used method, it can be readily obtained by effecting equilibration reaction between octamethylcyclotetrasiloxane and/or tetramethyl-cyclotetrasiloxane and a compound containing a hexamethyldisiloxane or 1,1'-dihydro-2,2', 3,3'-tetramethyldisiloxane unit to become a terminal group, in the presence of a catalyst such as sulfuric acid, trifluoromethanesulfonic acid or methanesulfonic acid at a temperature between about −10° C. and about +40° C.

Of these organohydrogenpolysiloxanes, it is preferred from the standpoint of the above-specified resilience (up to 30% according to JIS K-6301) and further, the above-specified hardness change under curing conditions or primary vulcanization conditions (up to ±5 Ascar CSR2 units) to use an organohydrogenpolysiloxane of the following general formula (1):

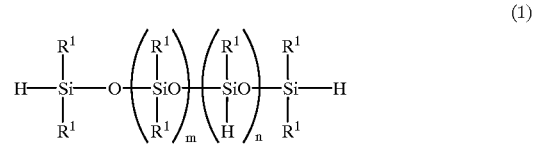

wherein $R^1$ is a substituted or unsubstituted monovalent hydrocarbon group, letters m and n are integers of at least 1.

In formula (1), $R^1$ has the same meaning as in formula (4) described above and is selected from substituted or unsubstituted monovalent hydrocarbon groups having 1 to 12 carbon atoms, preferably 1 to 8 carbon atoms, more preferably 1 to 4 carbon atoms, as defined for $R^2$. Especially, methyl, phenyl and 3,3,3-trifluoropropyl groups are preferred.

The organohydrogenpolysiloxane preferably has a viscosity of 0.2 to 1,000 cp at room temperature (25° C.), especially 1 to 700 cp at 25° C. The number of silicon atoms per molecule is preferably up to about 200, more preferably about 2 to 150, most preferably about 4 to 50.

Component (C) is a platinum catalyst for promoting addition reaction or hydrosilylation between components (A) and (B) for curing. It may be selected from well-known platinum catalysts including platinum and platinum compounds. Exemplary are platinum black, chloroplatinic acid, alcohol modified chloroplatinic acid, and complexes of chloroplatinic acid with olefins, aldehydes, vinylsiloxanes or acetylene alcohols. The amount of the platinum catalyst added is a catalytic amount which may be determined in accordance with the desired curing rate. Often, the platinum catalyst is used in such amounts as to provide 0.1 to 1,000 ppm, especially 1 to 200 ppm of platinum based on component (A).

Component (D) is a filler which imparts the desired hardness and physical strength (e.g., tensile strength) to addition reaction curing type liquid silicone rubber compositions. The filler used herein may be any of fillers commonly used in conventional silicone rubber compositions. Examples include silica fillers such as fumed silica, crystalline silica (quartz powder), precipitated silica, and hydrophobidized silica alone or in admixture. Such fillers are commercially available. For example, hydrophilic silica is commercially available under the trade name of Aerosil 130, 200 and 300 from Nippon Aerosil K.K. and Degussa Inc., Cabosil MS-5 and MS-7 from Cabot Corp., Rheorosil QS-102 and 103 from Tokuyama Soda K.K., and Nipsil LP from Nippon Silica K.K. Hydrophobic silica is commercially available under the trade name of Aerosil R-812, R-812S, R-972 and R-974 from Degussa Inc., Rheorosil MT-10 from Tokuyama Soda K.K., and Nipsil SS series from Nippon Silica K.K. Crystalline silica (quartz powder) is commercially available under the trade name of Crystalite (Tatsumori Corp.), Minusil (Pennsylvania Glass Sand Corp.) and Imsil (Illinois Minerals).

The amount of component (D) blended is about 5 to about 300 parts, preferably about 20 to about 200 parts by weight, per 100 parts by weight of component (A). Use of crystalline silica is preferred from the standpoint of the resilience of cured rubber.

Other additives may be added to the silicone rubber composition, if desired in order that the silicone rubber composition become more practical. Exemplary additives include fillers such as calcium carbonate; reinforcing fillers such as silicone resins; conductive agents such as carbon black, conductive zinc oxide, and metal powders of silver, copper and nickel; and heat resistance modifiers such as iron oxide and cerium oxide. Where it is desired to adjust the curing time, use may be made of cure regulators (retarder for the addition reaction), for example, vinyl-bearing organopolysiloxanes (e.g., tetravinyltetramethylcyclotetrasiloxane), triallyl isocyanurates, alkyl maleates, and acetylene alcohols and silane or siloxane modified products thereof, hydroperoxides, tetramethyl ethylenediamine, and benzotriazoles and mixtures.

After the respective components are admixed, the liquid silicone rubber composition may be cured by hot air vulcanization in a constant temperature chamber or mold-heating vulcanization in a mold of a press or injection molding machine. Typically, the composition is treated at 100 to 200° C. for about 10 to 30 minutes as primary vulcanization and preferably further treated at 150 to 200° C. for about 2 to 4 hours as secondary vulcanization.

In the fixing roll of the invention, the silicone rubber layer is covered with a surface layer or organic resin layer having a low surface energy which may be formed of a fluoroplastic resin or fluoroplastic latex. The fluoroplastic resins include polytetrafluoroethylene resins (PTFE), tetrafluoroethylene-perfluoroalkyl vinyl ether copolymer resins (PFA), perfluorinated ethylene-polypropylene copolymer resins (FEP), polyvinylidene fluoride resins (PVDF), and polyvinyl fluoride resins (PVF). The preferred fluoro-resins are tetrafluoroethylene-perfluoroalkyl vinyl ether copolymer resins (PFA). The surface of the fluoro-resin layer in contact with the silicone rubber is preferably subjected to corona discharge treatment, sodium naphthalene treatment, sputter etching, and liquid ammonia treatment for increasing the adhesion to the silicone rubber. Further the fluoro-resin layer may be treated with a primer for improving durable adhesion.

The fluoroplastic latexes include latexes of polytetrafluoroethylene resins (PTFE) and Dyel Latex (fluoroplastic latex by Daikin Industry K.K.).

The organic resin layer preferably has a thickness of up to 0.1 mm, especially 0.1 to 30 μm whereas the silicone rubber layer preferably has a thickness of about 1 to 30 mm.

The heat fixing roll of the invention can be prepared, for example, by the following methods. In a first method, a metal mandrel on the outer surface is pretreated with a primer. An addition reaction type liquid silicone rubber composition which is to cure into a silicone rubber having a resilience of up to 30%, preferably 5 to 25%, according to JIS K-6301 is molded and cured to the outer surface of the metal mandrel as by press molding or liquid injection molding, forming a silicone rubber layer. Then, a fluoroplastic latex coating composition such as a polytetrafluoroethylene (PTFE) latex coating solution is spray coated onto the silicone rubber layer and baked at high temperature, forming a fluoroplastic layer.

In a second method, a metal mandrel on the outer surface is pretreated with a primer, and a tetrafluoroethylene-perfluoroalkyl vinyl ether copolymer resin (PFA) tube on the inner surface is pretreated with a primer. The mandrel is inserted into the tube. An uncured silicone rubber composition is cast into the space between the tube and the mandrel and heat cured in situ, forming the roll. The roll forming method is not limited to these examples.

EXAMPLE

Blend examples, inventive examples, and comparative examples are given below for further illustrating the invention. The invention is not limited to the following Examples. All parts are by weight. The value of "mean particle size" is a weight average value (median diameter) measured by a particle size distribution measurement apparatus according to laser diffraction method.

Blend Example 1

A liquid composition 1 was prepared by uniformly mixing 100 parts of a linear dimethylsiloxane-methylvinylsiloxane copolymer blocked with trimethylsiloxy groups at both ends and having on average about 5 side-chain vinyl groups as methylvinylsiloxane units (degree of polymerization: about 700), 25 parts of crystalline silica having a mean particle size of 5 μm, and 2 parts of iron oxide. To this mixture were added 1.5 parts of methylhydrogenpolysiloxane of formula (i) having a viscosity of about 10 cp at 25° C., 4 parts of vinylmethylpolysiloxane containing 5 mol % of silicon atom-attached vinyl groups (–Si(CH$_3$)(CH=CH$_2$)O—) and having a viscosity of 1,000 cp at 25° C., 0.1 part of 1-ethynyl-1-cyclohexanol as a reaction controller, and 50 ppm calculated as platinum atom of a platinum-vinyl siloxane complex. The ingredients were thoroughly mixed until uniform.

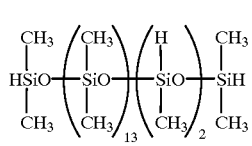

(i)

Blend Example 2

A liquid composition 2 was prepared by uniformly mixing 100 parts of the trimethylsiloxy-terminated dimethylsiloxane-methylvinylsiloxane copolymer used in Blend Example 1, 25 parts of crystalline silica having a mean particle size of 5 μm, and 2 parts of iron oxide. To this mixture were added 1.5 parts of methylhydrogenpolysiloxane of formula (ii) having a viscosity of about 38 cp at 25° C., 4 parts of vinylmethylpolysiloxane containing 5 mol % of silicon atom-attached vinyl groups (—Si(CH$_3$)(CH=CH$_2$)O—) and having a viscosity of 1,000 cp at 25° C., 0.1 part of 1-ethynyl-1-cyclohexanol as a reaction controller, and 50 ppm calculated as platinum atom of a platinum-vinyl siloxane complex. The ingredients were thoroughly mixed until uniform.

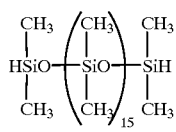

(ii)

Blend Example 3

A liquid composition 3 was prepared by uniformly mixing 100 parts of the trimethylsiloxy-terminated dimethylsiloxane-methylvinylsiloxane copolymer used in Blend Example 1, 25 parts of crystalline silica having a mean particle size of 5 μm, and 2 parts of iron oxide. To this mixture were added 1.5 parts of methylhydrogenpolysiloxane of formula (iii) having a viscosity of about 10 cp at 25° C., 4 parts of vinylmethylpolysiloxane containing 5 mol % of silicon atom-attached vinyl groups (—Si(CH$_3$)(CH=CH$_2$)O—) and having a viscosity of 1,000 cp at 25° C., 0.1 part of 1-ethynyl-1-cyclohexanol as a reaction controller, and 50ppm calculated as platinum atom of a platinum-vinyl siloxane complex. The ingredients were thoroughly mixed until uniform.

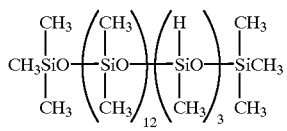

(iii)

Blend Example 4

A liquid composition 4 was prepared by uniformly mixing 100 parts of the trimethylsiloxy-terminated dimethylsiloxane-methylvinylsiloxane copolymer used in Blend Example 1, 25 parts of crystalline silica having a mean particle size of 5 μm, and 2 parts of iron oxide. To this mixture were added 1.0 part of methylhydrogenpolysiloxane of formula (iii) having a viscosity of about 10 cp at 25° C., 0.5 part of methylhydrogenpolysiloxane of formula (iv) having a viscosity of about 30 cp at 25° C., 4 parts of vinylmethylpolysiloxane containing 5 mol % of silicon atom-attached vinyl groups (—Si(CH$_3$)(CH=CH$_2$)O—) and having a viscosity of 1,000 cp at 25° C., 0.1 part of 1-ethynyl-1-cyclohexanol as a reaction controller, and 50 ppm calculated as platinum atom of a platinum-vinyl siloxane complex. The ingredients were thoroughly mixed until uniform.

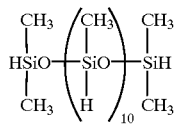

(iv)

Blend Example 5

A liquid composition 5 was prepared by uniformly mixing 100 parts of the trimethylsiloxy-terminated dimethylsiloxane-methylvinylsiloxane copolymer used in Blend Example 1, 25 parts of crystalline silica having a mean particle size of 5 μm, and 2 parts of iron oxide. To this mixture were added 1.0 part of methylhydrogenpolysiloxane of formula (i) having a viscosity of about 10 cp at 25° C., 0.5 part of methylhydrogenpolysiloxane of formula (v) having a viscosity of about 20 cp at 25° C., 4 parts of vinylmethylpolysiloxane containing 5 mol % of silicon atom-attached vinyl groups (—Si(CH$_3$)(CH=CH$_2$)O—) and having a viscosity of 1,000 cp at 25° C., 0.1 part of 1-ethynyl-1-cyclohexanol as a reaction controller, and 50 ppm calculated as platinum atom of a platinum-vinyl siloxane complex. The ingredients were thoroughly mixed until uniform.

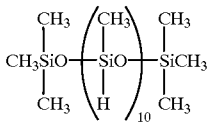

(v)

Blend Example 6

A liquid composition 6 was prepared by uniformly mixing 100 parts of the trimethylsiloxy-terminated dimethylsiloxane-methylvinylsiloxane copolymer used in Blend Example 1, 25 parts of crystalline silica having a mean particle size of 5 μm, and 2 parts of iron oxide. To this mixture were added 1.7 parts of methylhydrogenpolysiloxane of formula (i) having a viscosity of about 10 cp at 25° C., 4 parts of vinylmethylpolysiloxane containing 5 mol % of silicon atom-attached vinyl groups (—Si(CH$_3$)(CH=CH$_2$)O—) and having a viscosity of 1,000 cp at 25° C., 0.1 part of 1-ethynyl-1-cyclohexanol as a reaction controller, and 50 ppm calculated as platinum atom of a platinum-vinyl siloxane complex. The ingredients were thoroughly mixed until uniform.

Example 1

Liquid composition 1 was admitted into a mold cavity of 6 mm thick, where it was press vulcanized at 120° C., 140° C. or 200° C. for 10 minutes or 30 minutes. The test pieces of cured rubber were taken out of the mold and cooled to room temperature. The test pieces were measured for rubber hardness by means of an Ascar CSR2 hardness meter and also for resilience according to JIS K-6301. The hardness in Ascar CSR2 unit was 30 at 120° C./10 min., 31 at 120° C./30 min., 32 at 140° C./10 min., 34 at 140° C./30 min., 34 at 200° C./10 min., and 37 at 200° C./30 min. The resilience was 20%.

A primer No. 101A/B for addition reaction type liquid silicone rubber (by Shin-Etsu Chemical Co., Ltd.) was applied to an aluminum shaft having a diameter of 24 mm and a length of 300 mm. Liquid composition 1 was applied to the shaft, heat cured at 150° C. for 30 minutes, and post cured at 200° C. for 4 hours. A primer GLP-103SR for Dyel Latex and silicone rubber (by Daikin Industry K.K.) was uniformly applied to the surface of the cured silicone rubber, and heated at 80° C. for 10 minutes. Then Dyel Latex GLS-213 (by Daikin Industry K.K.) was uniformly sprayed to the primed silicone rubber, and baked at 300° C. for 1 hour, obtaining a Dyel Latex-covered low-hardness silicone rubber roll having an outer diameter of 26 mm and a length of 250 mm.

Separately, a polytetrafluoroethylene latex was coated onto the surface of an aluminum shaft having a diameter of 50 mm and a length of 300 mm and baked at 300° C. for 15 minutes. This roll was placed in contact with the Dyel Latex-covered silicone rubber roll. With a load of 2 kg applied, a nip width of 20 mm was measured.

The Dyel Latex-covered silicone rubber roll was incorporated in a PPC copier as the fixing roll whereupon duplication was carried out 100,000 sheets, obtaining satisfactory copies.

Example 2

A primer No. 101A/B for addition reaction type liquid silicone rubber (by Shin-Etsu Chemical Co., Ltd.) was applied to an aluminum shaft having a diameter of 24 mm and a length of 300 mm. The shaft was inserted into a fluoroplastic PFA tube with a gage of 50 μm which had been treated on its inner surface with the primer. Liquid composition 1 was introduced between the tube and the shaft, heat cured at 150° C. for 30 minutes and post cured at 200° C. for 4 hours. There was formed a PFA resin-covered low-hardness silicone rubber roll having an outer diameter of 26 mm and a length of 250 mm.

Separately, a polytetrafluoroethylene latex was coated onto the surface of an aluminum shaft having a diameter of 50 mm and a length of 300 mm and baked at 300° C. for 15 minutes. This roll was placed in contact with the PFA resin-covered silicone rubber roll. With a load of 2 kg applied, a nip width of 20 mm was measured.

The PFA resin-covered silicone rubber roll was incorporated in a PPC copier as the fixing roll whereupon duplication was carried out 100,000 sheets, obtaining satisfactory copies.

Example 3

Liquid composition 6 was admitted into a mold cavity of 6 mm thick, where it was press vulcanized at 120° C., 140° C. or 200° C. for 10 minutes or 30 minutes. The test pieces of cured rubber were taken out of the mold and cooled to room temperature. The test pieces were measured for rubber hardness by means of an Ascar CSR2 hardness meter and also for resilience according to JIS K-6301. The hardness in Ascar CSR2 unit was 34 at 120° C. for 10 minutes, 36 at 140° C. for 10 minutes, and 38 at 200° C. for 10 minutes and 40 at 200° C. for 30 minutes. The resilience was 25%.

A primer No. 101A/B for addition reaction type liquid silicone rubber (by Shin-Etsu Chemical Co., Ltd.) was applied to an aluminum shaft having a diameter of 24 mm and a length of 300 mm. Liquid composition 6 was applied to the shaft, heat cured at 150° C. for 30 minutes, and post cured at 200° C. for 4 hours. A primer GLP-103SR for Dyel Latex and silicone rubber (by Daikin Industry K.K.) was uniformly applied to the surface of the cured silicone rubber, and heated at 80° C. for 10 minutes. Then Dyel Latex GLS-213 (by Daikin Industry K.K.) was uniformly sprayed to the primed silicone rubber, and baked at 300° C. for 1 hour, obtaining a Dyel Latex-covered low-hardness silicone rubber roll having an outer diameter of 26 mm and a length of 250 mm.

Separately, a polytetrafluoroethylene latex was coated onto the surface of an aluminum shaft having a diameter of 50 mm and a length of 300 mm and baked at 300° C. for 15 minutes. This roll was placed in contact with the Dyel Latex-covered silicone rubber roll. With a load of 2 kg applied, a nip width of 20 mm was measured.

The Dyel Latex-covered silicone rubber roll was incorporated in a PPC copier as the fixing roll whereupon duplication was carried out 100,000 sheets, obtaining satisfactory copies.

Comparative Example 1

Liquid composition 2 was admitted into a mold cavity of 6 mm thick, where it was press vulcanized at 120° C., 140° C. or 200° C. for 10 minutes. The test pieces of cured rubber were taken out of the mold and cooled to room temperature. The test pieces were measured for rubber hardness by means of an Ascar CSR2 hardness meter and also for resilience according to JIS K-6301. The hardness in Ascar CSR2 unit was 20 at 120° C., 26 at 140° C., and 32 at 200° C. The resilience was 33%.

A primer No. 101A/B for addition reaction type liquid silicone rubber (by Shin-Etsu Chemical Co., Ltd.) was applied to an aluminum shaft having a diameter of 24 mm and a length of 300 mm. The shaft was inserted into a fluoroplastic PFA tube with a gage of 50 μm which had been treated on its inner surface with the primer. Liquid composition 2 was introduced between the tube and the shaft, heat cured at 150° C. for 30 minutes and post cured at 200° C. for 4 hours. There was formed a PFA resin-covered low-hardness silicone rubber roll having an outer diameter of 26 mm and a length of 250 mm.

Separately, a polytetrafluoroethylene latex was coated onto the surface of an aluminum shaft having a diameter of 50 mm and a length of 300 mm and baked at 300° C. for 15 minutes. This roll was placed in contact with the PFA resin-covered silicone rubber roll. With a load of 2 kg applied, a nip width of 17 mm was measured.

The PFA resin-covered silicone rubber roll was incorporated in a PPC copier as the fixing roll whereupon duplication was carried out 5,000 sheets. The PFA tube separated from the silicone rubber layer. The copies bore unevenly fixed images.

Comparative Example 2

Liquid composition 3 was admitted into a mold cavity of 6 mm thick, where it was press vulcanized at 120° C., 140° C. or 200° C. for 10 minutes. The test pieces of cured rubber were taken out of the mold and cooled to room temperature. The test pieces were measured for rubber hardness by means of an Ascar CSR2 hardness meter and also for resilience according to JIS K-6301. The hardness in Ascar CSR2 unit was 30 at 120° C., 36 at 140° C., and 43 at 200° C. The resilience was 32%.

A primer No. 101A/B for addition reaction type liquid silicone rubber (by Shin-Etsu Chemical Co., Ltd.) was applied to an aluminum shaft having a diameter of 24 mm and a length of 300 mm. The shaft was inserted into a fluoroplastic PFA tube with a gage of 50 μm which had been treated on its inner surface with the primer. Liquid composition 3 was introduced between the tube and the shaft, heat cured at 150° C. for 30 minutes and post cured at 200° C. for 4 hours. There was formed a PFA resin-covered low-hardness silicone rubber roll having an outer diameter of 26 mm and a length of 250 mm.

Separately, a polytetrafluoroethylene latex was coated onto the surface of an aluminum shaft having a diameter of 50 mm and a length of 300 mm and baked at 300° C. for 15 minutes. This roll was placed in contact with the PFA resin-covered silicone rubber roll. With a load of 2 kg applied, a nip width of 15 mm was measured.

The PFA resin-covered silicone rubber roll was incorporated in a PPC copier as the fixing roll whereupon duplication was carried out 5,000 sheets. The PFA tube separated from the silicone rubber layer.

Comparative Example 3

Liquid composition 4 was admitted into a mold cavity of 6 mm thick, where it was press vulcanized at 120° C., 140°

C. or 200° C. for 10 minutes. The test pieces of cured rubber were taken out of the mold and cooled to room temperature. The test pieces were measured for rubber hardness by means of an Ascar CSR2 hardness meter and also for resilience according to JIS K-6301. The hardness in Ascar CSR2 unit was 32 at 120° C., 37 at 140° C., and 43 at 200° C. The resilience was 35%.

A primer No. 101A/B for addition reaction type liquid silicone rubber (by Shin-Etsu Chemical Co., Ltd.) was applied to an aluminum shaft having a diameter of 24 mm and a length of 300 mm. The shaft was inserted into a fluoroplastic PFA tube with a gage of 50 μm which had been treated on its inner surface with the primer. Liquid composition 4 was introduced between the tube and the shaft, heat cured at 150° C. for 30 minutes and post cured at 200° C. for 4 hours. There was formed a PFA resin-covered low-hardness silicone rubber roll having an outer diameter of 26 mm and a length of 250 mm.

Separately, a polytetrafluoroethylene latex was coated onto the surface of an aluminum shaft having a diameter of 50 mm and a length of 300 mm and baked at 300° C. for 15 minutes. This roll was placed in contact with the PFA resin-covered silicone rubber roll. With a load of 2 kg applied, a nip width of 14 mm was measured.

The PFA resin-covered silicone rubber roll was incorporated in a PPC copier as the fixing roll whereupon duplication was carried out 5,000 sheets. The copies bore unevenly fixed images.

Comparative Example 4

Liquid composition 5 was admitted into a mold cavity of 6 mm thick, where it was press vulcanized at 120° C., 140° C. or 200° C. for 10 minutes. The test pieces of cured rubber were taken out of the mold and cooled to room temperature. The test pieces were measured for rubber hardness by means of an Ascar CSR2 hardness meter and also for resilience according to JIS K-6301. The hardness in Ascar CSR2 unit was 41 at 120° C., 47 at 140° C., and 54 at 200° C. The resilience was 37%.

A primer No. 101A/B for addition reaction type liquid silicone rubber (by Shin-Etsu Chemical Co., Ltd.) was applied to an aluminum shaft having a diameter of 24 mm and a length of 300 mm. The shaft was inserted into a fluoroplastic PFA tube with a gage of 50 μm which had been treated on its inner surface with the primer. Liquid composition 5 was introduced between the tube and the shaft, heat cured at 150° C. for 30 minutes and post cured at 200° C. for 4 hours. There was formed a PFA resin-covered low-hardness silicone rubber roll having an outer diameter of 26 mm and a length of 250 mm.

Separately, a polytetrafluoroethylene latex was coated onto the surface of an aluminum shaft having a diameter of 50 mm and a length of 300 mm and baked at 300° C. for 15 minutes. This roll was placed in contact with the PFA resin-covered silicone rubber roll. With a load of 2 kg applied, a nip width of 12 mm was measured.

The PFA resin-covered silicone rubber roll was incorporated in a PPC copier as the fixing roll whereupon duplication was carried out 5,000 sheets. The copies bore unevenly fixed images.

There has been described a low-hardness silicone rubber fixing roll comprising a silicone rubber layer formed on a metal mandrel by curing an addition reaction curing type liquid silicone rubber composition so as to provide a specific resilience, and an organic resin layer thereon whereby an appropriate nip width is obtained even under a low nip pressure and even when the silicone rubber layer is made thin.

Japanese Patent Application No. 290450/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A low-hardness silicone rubber fixing roll comprising:
   a cylindrical metal mandrel,
   a silicone rubber layer formed on the outer surface of the mandrel by curing an addition reaction curing type liquid silicone rubber composition thereto, the cured silicone rubber having a resilience of up to 30% according to JIS K-6301,
   an organic resin layer having a low surface energy formed on the outer surface of the silicone rubber layer, and
   when said silicone rubber composition is cured under primary vulcanization conditions including a temperature of 100 to 200° C. and a time of 10 to 30 minutes, the cured silicone rubber having a maximum hardness and a minimum hardness, the difference between the maximum hardness and the minimum hardness being up to 10 Ascar CSR2 units.

2. The fixing roll of claim 1 wherein said liquid silicone rubber composition comprises
   (A) 100 parts by weight of an organopolysiloxane containing per molecule at least two aliphatic unsaturated hydrocarbon groups each attached to a silicon atom only in side chains of the molecule, the content of siloxane units containing the aliphatic unsaturated hydrocarbon groups being 0.05 to 5 mol %,
   (B) an organohydrogenpolysiloxane having at least three hydrogen atoms each directly attached to a silicon atom per molecule and represented by the following general formula (1):

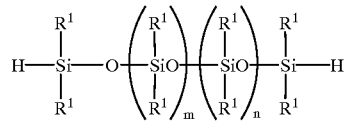

wherein $R^1$ is a substituted or unsubstituted monovalent hydrocarbon group, letters m and n are integers of at least 1, in such an amount that 0.1 to 3.0 mols of hydrogen atoms directly attached to silicon atoms in component (B) are available relative to 1.0 mol of the aliphatic unsaturated hydrocarbon groups attached to silicon atoms in component (A),
   (C) a catalytic amount of a platinum catalyst, and
   (D) about 5 to 300 parts by weight of a filler.

3. The fixing roll of claim 2, wherein the organopolysiloxane, (A), is of the following average compositional formula (2):

$$R_a SiO_{(4-a)/2}$$

wherein each R is a substituted or unsubstituted monovalent hydrocarbon group of 1 to 12 carbon atoms and letter a is a positive number of 1.9 to 2.4.

4. The fixing roll of claim 3, wherein in formula (2) each R is a monovalent alkyl, phenyl, tolyl, benzyl or phenethyl group of 1 to 12 carbon atoms, each optionally substituted by halogen atoms or cyano groups.

5. The fixing roll of claim 2, wherein the organopolysiloxane, (A), is of the formula (3):

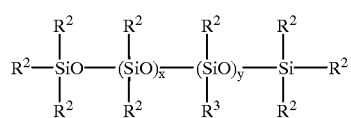
(3)

wherein $R^2$ represents substituted or unsubstituted monovalent hydrocarbon groups excluding aliphatic unsaturated hydrocarbon groups, $R^3$ represents monovalent aliphatic unsaturated hydrocarbon groups, letters x and y are integers satisfying $x \geq 38$, $y \geq 2$, $40 \leq x+y \leq 20,000$.

6. The fixing roll of claim 5, wherein each $R^2$ is a monovalent alkyl, phenyl, tolyl, benzyl or phenethyl group of 1 to 12 carbon atoms, each optionally substituted by halogen atoms or cyano groups, and each $R^3$ is an alkenyl group of 2 to 6 carbon atoms.

7. The fixing roll of claim 5, wherein the organopolysiloxane, (A), of formula (3) has a degree of polymerization of about 50 to 20,000.

8. The fixing roll of claim 2, wherein the content of siloxane units containing the aliphatic unsaturated hydrocarbon groups in organopolysiloxane,(A), is from 0.1 to 3.0%.

9. The fixing roll of claim 2, wherein in the organohydrogenpolysiloxane of formula (1), each $R^1$ is a monovalent alkyl, phenyl, tolyl, benzyl or phenethyl group of 1 to 12 carbon atoms, each optionally substituted by halogen atoms or cyano groups.

10. The fixing roll of claim 1, wherein the cured silicone rubber has a resilience of 5 to 25% by JIS K-6301.

11. The fixing roll of claim 1, wherein the cured silicone rubber has a resilience of 10 to 20% by JIS K-6301.

12. The fixing roll of claim 1, wherein the organic resin layer is formed of a fluoroplastic resin or fluoroplastic latex.

13. The fixing roll of claim 1, wherein the organic resin layer is formed of a tetrafluoroethylene-perfluoroalkyl vinyl ether copolymer fluororesin.

14. The fixing roll of claim 1, wherein the organic resin layer has a thickness of up to 0.1 mm and the silicone rubber layer has a thickness of about 1 to 30 m.

* * * * *